Sept. 21, 1971    W. L. DAVIS    3,606,727
PLASTIC BAG SEALER

Filed July 7, 1969    3 Sheets-Sheet 1

INVENTOR
WILLIAM LOURDES DAVIS
BY *[signature]*
ATT'YS.

Sept. 21, 1971  W. L. DAVIS  3,606,727

PLASTIC BAG SEALER

Filed July 7, 1969  3 Sheets-Sheet 2 understand# United States Patent Office 3,606,727
Patented Sept. 21, 1971

3,606,727
PLASTIC BAG SEALER
William Lourdes Davis, Davenport, Iowa, assignor to
The Kartridg Pak Co., Davenport, Iowa
Filed July 7, 1969, Ser. No. 839,302
Int. Cl. B65b 57/00, 51/20
U.S. Cl. 53—52                                      10 Claims

ABSTRACT OF THE DISCLOSURE

A machine for heat sealing the tops of plastic bags which are either plain, flat folded, or gusset-type, the machine being characterized by hot air sealing nozzles and associated electric heaters positioned at a seal forming station along the path traversed by co-operating runs of parallel, endless traveling conveyor belts which grip the folded or closed tops of the bags adjacent the seal forming area and advance with the same past the seal forming station to a seal cooling station where cold air nozzles set the seal, with the bags being carried on a supporting conveyor and with means for controlling the speed of the bag supporting and top gripping conveyors which is responsive to a thickness sensing means to automatically slow down the travel of the bag past the seal forming station when a thicker portion of the bag, such as a gusseted portion, reaches the seal forming station.

---

This invention relates to equipment for closing bags and is more particularly concerned with improvements in machines for heat sealing the flat folded or closed tops of bags which are made of thermoplastic film or the like.

Various machines have been devised heretofore for sealing the flat folded tops of bags after they have been filled with products of various kinds. Some of these machines employ heaters for activating a coating or other seal forming material on the surfaces of the bag tops which may be folded over in closing the same. Many of these machines operate to provide a satisfactory seal when the bag top material is of uniform thickness, that is, when there is little or no variation in the thickness of the material in the area to be sealed. However, when there is appreciable variation in the thickness of the material in the seal forming area, as for example, a double ply mid section and a four ply end or side section in the flat folded top of a bag having gusseted side walls, it is difficult to obtain a satisfactory seal with equipment presently available. It is a general object, therefore, of the present invention to provide improved equipment for heat sealing the closed tops of plastic bags and the like which will produce a satisfactory seal when the sealing area has uniform thickness and also when there is an appreciable change in the thickness of the material along the seal forming area.

It is a more specific object of the invention to provide a bag top sealing apparatus which embodies a heat applying station at which a seal is formed by activating thermo-sealing material on the engaged bag walls, and associated mechanism for varying the application of the heat to selected portions of the seal forming area.

It is a further object of the invention to provide a bag top sealing apparatus wherein the folded bag top is advanced through a sealing station where heat is applied to selected areas for forming the seal and the application of the heat is confined to predetermined portions of the bag top so as to eliminate any need for trimming or otherwise defining the bag top in order to accurately position the seal area.

It is another object of the invention to provide a bag top sealing mechanism wherein the folded bag top is passed through a heating zone for the application of heat to fuse the material in the sealing area and a means is provided for controlling the movement of the bag in accordance with the thickness of the material or the number of plies thereof in the area to be sealed.

A still further object of the invention is to provide an apparatus for heat sealing the folded top of a bag which is formed of thermoplastic material and which has variations in thickness in the sealing area, the bag being advanced by conveyors, the speed of which is controlled in response to a thickness sensor, so as to automatically slow down the advance of the bag when there is an increase in the thickness of the material in the sealing area thereby to subject the thickened area to the sealing heat for a longer period of time.

These and other objects and advantages of the invention will be apparent from a consideration of the bag top sealing apparatus which is shown by way of illustration in the accompanying drawings wherein.

Figure 1:
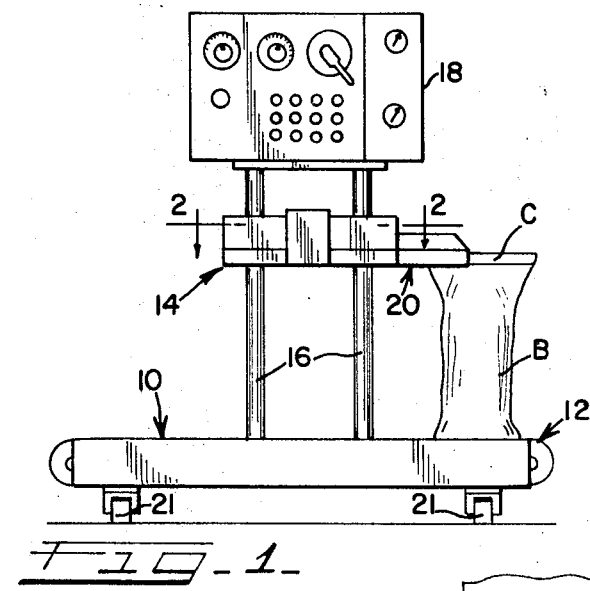
FIG. 1 is an elevation of a bag sealing machine which incorporates therein the principal features of the invention.
Figure 8:
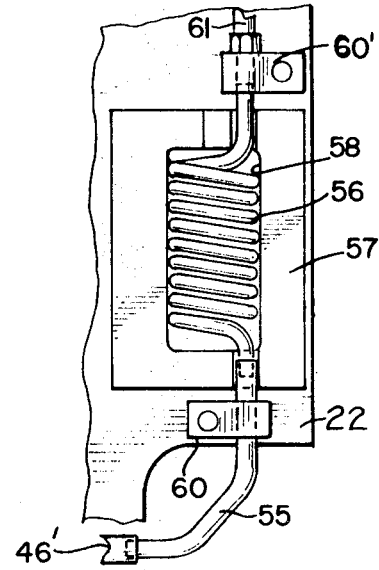
FIG. 8 is a fragmentary section taken on the line 8—8 of FIG. 4, to a larger scale.

The machine shown in FIG. 1 is designed to seal the tops of relatively large bags B which, in the form shown, have a flat, folded top closure C. The base 10 of the machine on which the bag B is supported for travel through the machine includes a traveling conveyor 12 on which the bags B are positioned and advanced so that the folded closure C passes through a sealing head 14 which is supported for vertical adjustment on a pair of upright parallel posts 16, with the latter extending to a top cabinet 18 in which electrical and other controls for the machine are housed. The conveyor 12 and a conveyor mechanism, indicated at 20, in the head 14 are driven in a synchronized manner, as hereinafter described. The bag B, as illustrated, is of a type which is closed at C by folding the top margins of the side walls into face contact so that there is a uniform thickness across the top margin of two or more plies of the material. The machine is designed to seal the tops of either a folded bag top closure of uniform thickness or a folded closure for a bag having side gussets which, when the mouth is closed, results in an appreciably greater thickness of material in the portion of the sealing area which includes the gusset folds.

The base structure 10 in the form of the machine illustrated includes frame members and the bag supporting conveyor 12 which may be a flat belt-type conveyor carried on end rollers suitably supported in the frame members and driven in a conventional manner by a separate motor (not shown) mounted on the frame members. Rollers 21 may be provided on bottom of the base 10 to facilitate moving the machine about.

Figure 2:
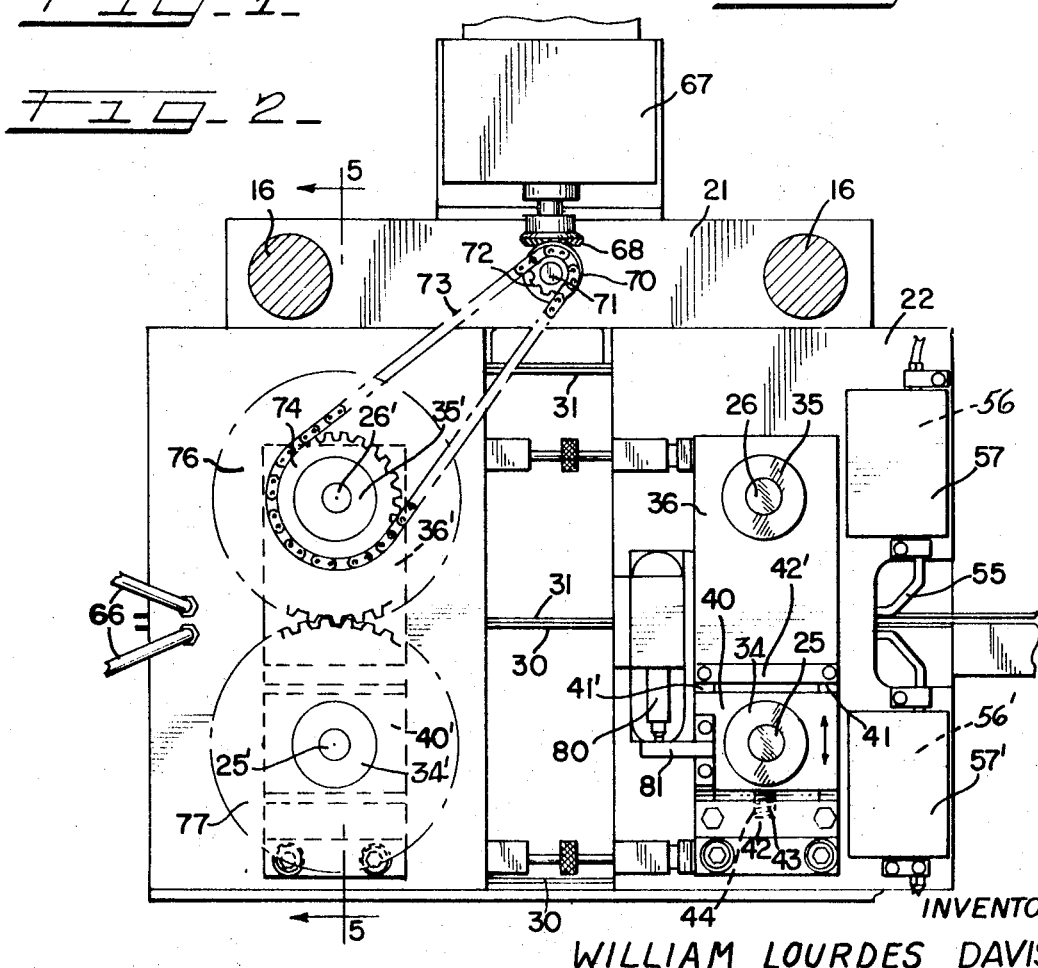
FIG. 2 is a view, to an enlarged scale, taken on the line 2—2 of FIG. 1.
Figure 3:
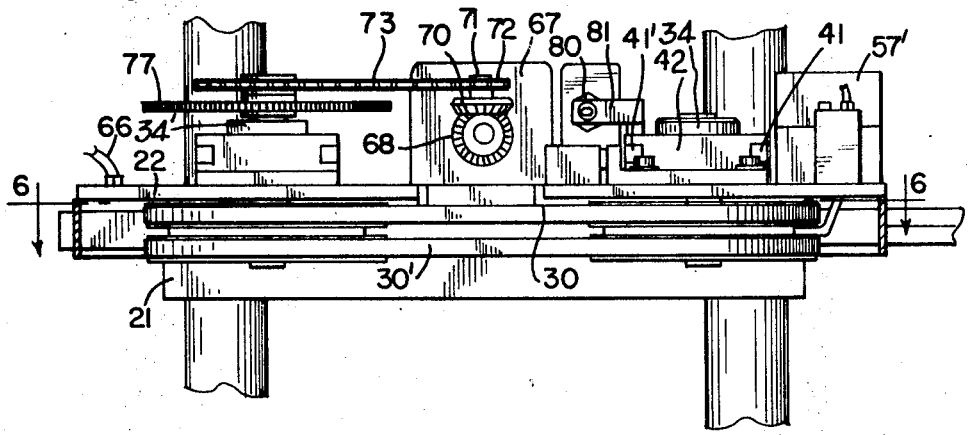
FIG. 3 is a side elevation of the sealing head, to an enlarged scale.
Figure 4:
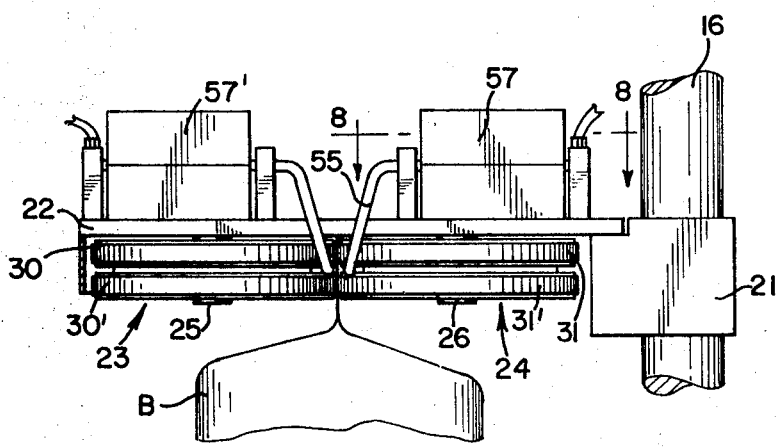
FIG. 4 is an end elevation of the sealing head shown in FIG. 3.
Figure 5:
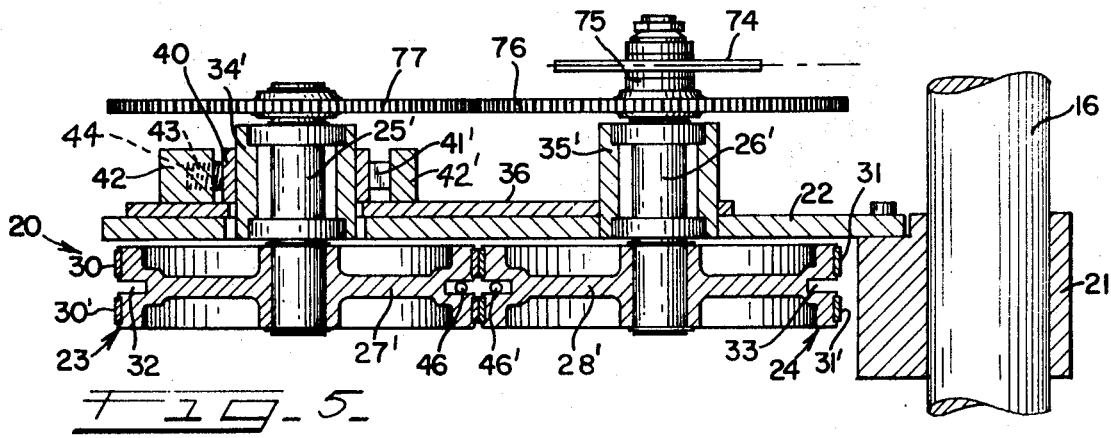
FIG. 5 is a cross section taken on the line 5—5 of FIG. 2, to an enlarged scale.
Figure 6:
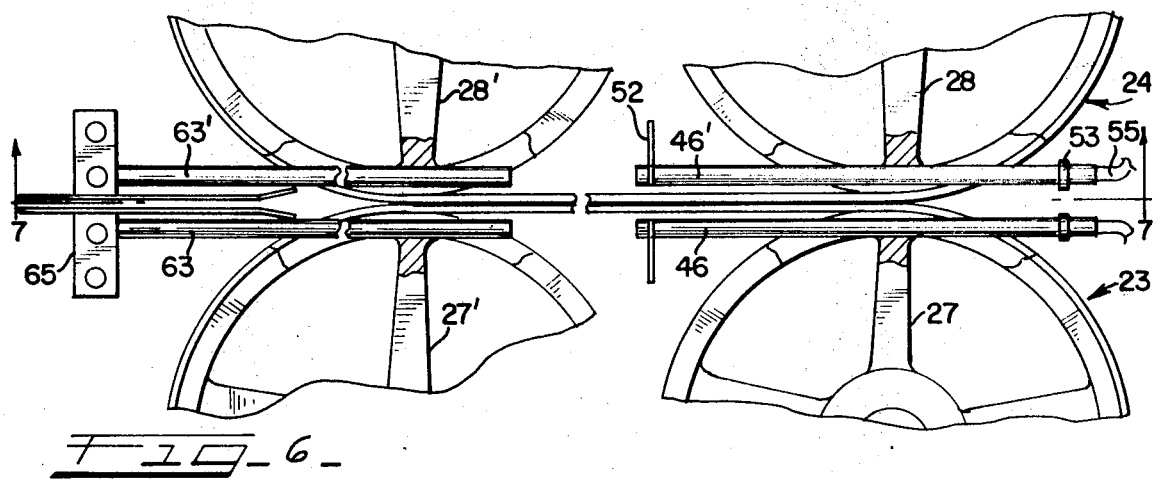
FIG. 6 is a fragmentary section taken on the line 6—6 of FIG. 3, to a larger scale and with portions broken away.

The sealing head 14 is mounted for vertical adjustment on the upright posts 16 with a back frame portion 21 of the head (FIG. 2) extending between the posts 16 and constituting a supporting carriage. Any suitable arrangement may be employed for adjustably securing the frame member 21 on the posts 16 so as to adapt the head 14 to use with bags of different heights. The main frame portion of the head 14 comprises a base plate 22 (FIGS. 2 to 5) which is of rectangular shape and which is secured along its inner margins to the carriage forming member 21 by bolts or the like. The conveyor assembly 20 in the head 14 comprises two endless belt conveyors 23 and 24 which are supported on the bottom ends of vertical shafts 25, 25' and 26, 26' by means of end pulleys 27 and 27' and 28 and 28' (FIG. 6) which are located beneath the bottom face of the base plate 22. The conveyors 23 and 24 comprise pairs of relatively narrow, flat belts 30, 30' and 31, 31' which are carried on the pulleys 27, 27' and 28, 28'. The belts of each pair thereof are in spaced relation above and below slots or peripheral recesses indicated at 32 and 33 (FIG. 5) in the respective pairs of front and back pulleys. The slots 32 and 33 provide space for accommodating sealing and cooling nozzles between the upper and lower belts of each pair thereof, and the width between the upper and lower belts determines the width of the sealing area, the top belts 30, 31 and the bottom belts 30', 31' engaging the bag top, as it passes between the pulleys, above and below the sealing area so as to hold the material in tight engagement while the heat is applied to fuse the same and form the seal. The belt carrying pulleys 27, 27' and 28, 28' are mounted on the lowermost ends of the vertically disposed supporting shafts 25, 25' and 26, 26' and the latter are journaled in bearing supports 34, 34' and 35, 35'. The bearings 35 and 35' on the innermost conveyor are mounted on fixed plates 36, 36' which are secured on the upper face of the base plate 22 with the bearings extending through apertures in both of these plates. The bearings 34 and 34' for the shafts 25 and 25' on the outermost conveyor 23 are mounted in slidably mounted supports blocks 40 and 40', each of which is supported in an identical manner as shown in FIGS. 2, 3 and 5. Each of the bearing support blocks 40 and 40' is carried on guide forming bars 41 and 41' secured at opposite ends to the support bars or blocks 42 and 42'. The blocks 40 and 40' are proportioned so that there can be a small amount of movement of the same transversely of the path of the confronting runs of the inner and outer pairs of belts. A compression spring 43 is seated in a suitable recess 44 in the front bar 42 for urging the block 40 toward the posts 16 while a like spring urges the block 40' in the same direction.

The bag top C to be sealed is initially received between the two double belt conveyors 23 and 24 at the entrance end of the machine as the belts 30, 30' and 31, 31' come together between the pulleys 27 and 28. Hot air is applied at this point to effect the sealing of the bag top materials by means of nozzle forming tubes 46 and 46' which are of identical construction and which supply hot air for the sealing operation in an identical manner. The tubes 46 and 46' are arranged in parallel relation and mounted so as to be disposed in the recesses 32 and 33, respectively, at the entrance end of the machine where the belts 30, 30' and 31, 31' are in confronting relation on opposite sides of the bag top material.

Figure 7:
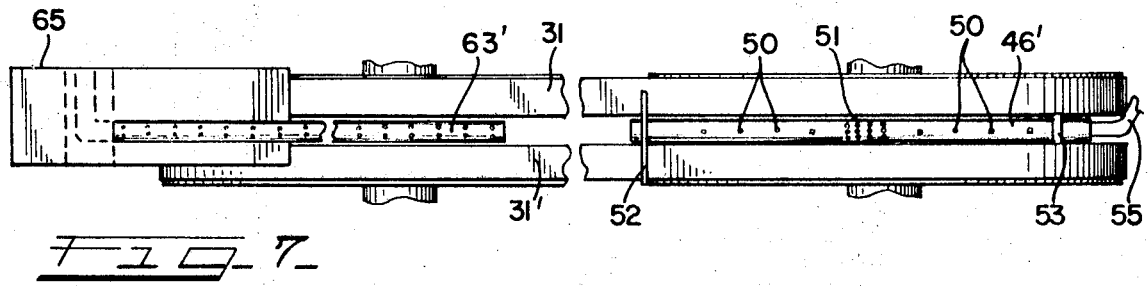
FIG. 7 is a view, taken on the line 7—7 of FIG. 6.

The tubes 46 and 46' are supplied with hot air in an identical manner. As shown in FIG. 7, the tube 46' has spaced discharge apertures 50 with a central group of apertures 51 which are arranged in multiple rows and closely spaced relative to the spacing of the apertures 50 on either side of the group. The tube 46' is supported by end brackets 52 and 53 depending from the base plate 22 and has a tubular connector 55 at its outer end which extends upwardly and is bent to connect with a heating coil 56 supported in an insulated housing assembly 57 and preferably enclosed in a heat insulating blanket (not shown) which is in the nature of a liner for the recess 58 in the supporting portion of the housing assembly 57. The coil 56 is provided at opposite ends with connector members 60 and 60' which are connected into the electrical circuit so as to pass a current through the coil sufficient to heat the same. The end of the coil 56 opposite the connector 55 has a connection at 61 with an air line for supplying air to the same. The block which forms the housing 57 for the heating coil 56 is, of course, secured at one side of the entrance to the machine on the base plate 22. A corresponding coil and housing assembly, indicated at 57, is mounted on the opposite side of the entrance end of the machine and the pipe 46 is connected thereto and receives heated air for sealing in the same manner so that hot sealing air is applied to both faces of the bag in the seal forming area.

The bag top C is carried by the belts 30, 30' and 31, 31' through the heat applying area and advanced to a cooling area at the other end of the machine where a pair of nozzle-like cooling tubes 63 and 63' are disposed in the recesses 32 and 33 in the pulleys 27' and 28' so as to extend in parallel relation on opposite sides of the path of travel of the bag top. Each of the tubes 63 and 63' is connected in communicating relationship with a block 65 having passageways leading to the tubes 63 and 63' for connection with a cold air line 66 at the exit end of the machine.

The conveyors 25 and 26 are driven by a suitable motor 67 supported on the outside face of the frame member 21 and having a power output shaft with a miter gear 68 which drives a co-operating miter gear 70 on a small shaft 71 suitably supported on the framing and having a sprocket 72 which drives a chain 73 and in turn drives the sprocket 74 on the top end of the pulley shaft 26'. A clutch indicated at 75 connects the drive sprocket 74 with the shaft 26' on which there is mounted a gear 76 connected in driving relation with a gear 77 on the upper end of the vertical conveyor shaft 25'. The relative movement between the shafts 25' and 26' is small and not sufficient to disengage the gears 76 and 77.

A thickness sensing switch assembly 80 is mounted adjacent the slide block 40 and an actuating arm 81 is bolted or otherwise secured to the block 40 in position to actuate the switch 80 upon lateral movement of the block 40.

Figure 9:
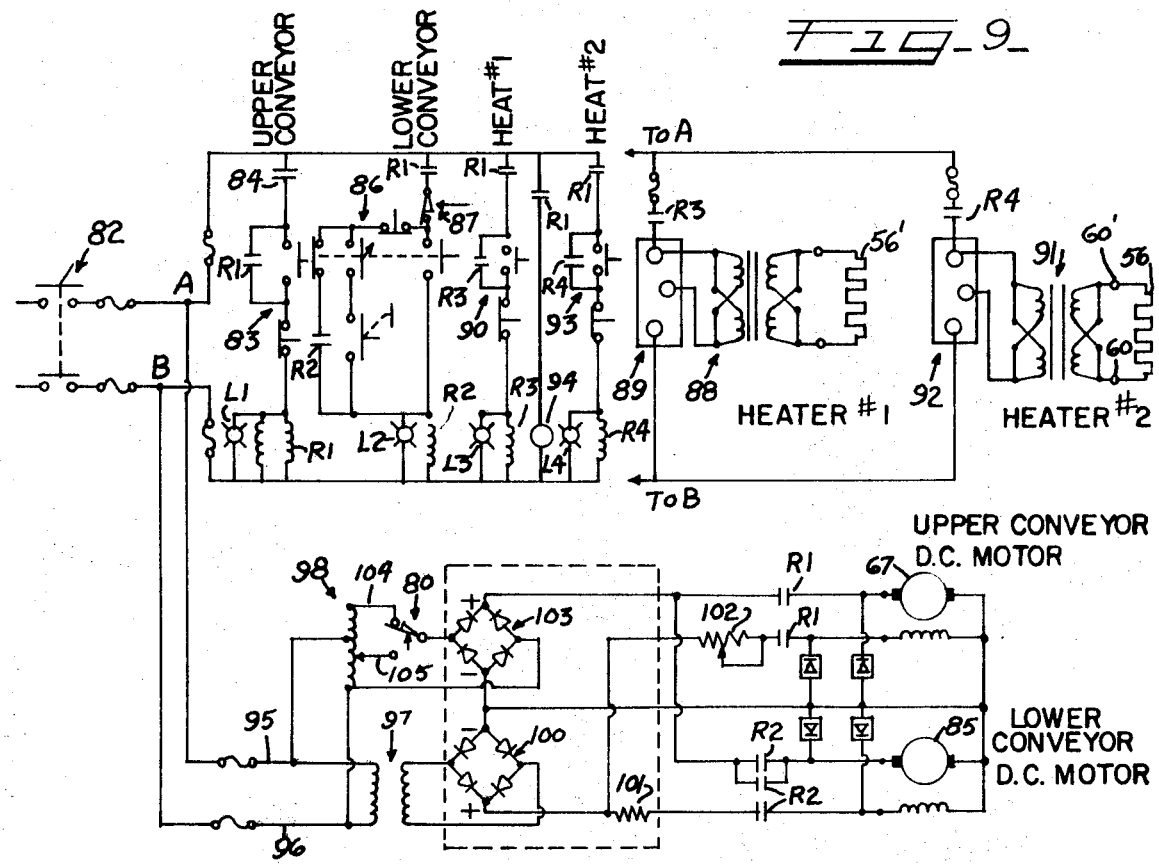
FIG. 9 is a diagrammatic view illustrating the electrical controls for the machine.

Referring to FIG. 9 the control circuit derives current through a main switch 82 protected by suitable fuses or circuit breakers. The control circuits which are at the top in FIG. 9 are protected by suitable fuses and likewise the motor circuits which are at the lower part of the diagram. The control circuit for the motor 67 which drives the sealing conveyor assembly 20 includes an air solenoid controlled relay R1 and a start-and-stop switch arrangement 83 together with a normally open pressure interlock switch 84 which closes when air is turned on. This switch requires that air be supplied under pressure before the machine can be operated to help prevent damage to the heater circuits. With air turned on and switch 84 closed the relay R1 may be actuated by the switch 83 to operate the conveyor motor 67 as hereinafter described. A signal light L1 associated with relay R1 indicates current in this circuit. The control circuit for the motor 85 which drives the lower bag supporting conveyor 12, when one is used, includes a combination selector switch assembly 86 for start-and-stop and foot control of relay R2 and limit switch 87 which is actuated by a sealed bag to stop the bag supporting or lower conveyor 12 when the operator fails to remove the same from the conveyor 12. The control circuits for the two air heater tubes 56 and 56', as indicated, include, for front tube 56', transformer 88 and associated variac 89 (for controlling the voltage to the transformer) which is fed through relay R3 with on-and-off switch 90 controlling current through relay contact R1 and, for tube 56, transformer 91 and associated variac 92 which is fed through relay R4 with on-and off switch 93 controlling current through relay contact R1. Pilot lights L3 and L4 are provided for the relays R3 and R4, respectively. If a vacuum motor is included, which may be desirable for some installations, it may be incorporated in the circuit as indicated at 94. The motor operating circuits show control of the current to the upper conveyor motor 67 and the lower conveyor motor 85 through relays R1 and R2. Current is supplied through lines 95 and 96 to isolation transformer 97 and autotransformer 98. The isolation transformer 97 supplies a voltage to a full wave rectifier 100 on through fixed resistor 101 and R2 relay contact to the shunt field of the lower conveyor drive motor 85. Also, the voltage for the shunt field of the upper conveyor drive motor is supplied by the isolation transformer 97 through a speed synchronizing resistor 102 and relay contact R1. The autotransformer 98 supplies current through the upper full wave rectifier 103 to each of the motor armature circuits. The speed change system for sealing gusseted bags is incorporated in the autotransformer arrangement. Two voltages are supplied through lines 104 and 105. When the speed change switch 80 is in the normally open position shown, full voltage is supplied to the armature circuits and the motors 67 and 85 run at top speed. When a gusseted area or other thicker area advances between the entrance to the conveyor belt assemblies 23 and 24 the pulley support for conveyor 23 is moved forward and the switch 80 is closed which reduces the voltage and slows down the two conveyors to a preset slow speed. Line 105 is preset to lower-than-maximum to maximum voltage. When set at maximum, no speed change results when a gusseted bag portion passes through the movable pulley area. When set to a lower-than-maximum voltage the passage of a gusseted bag portion slows down both conveyors to a speed sufficient to properly fuse the material. When the gusseted portion has passed the movable pulley returns to its normal position and the switch 80 is returned to its normally open position for sealing of the thinner bag section. Other suitable electrical circuitry may be employed or other control arrangements, such as, mechanical clutching through gear change systems, to obtain the desired operation of the conveyors.

While a bag support frame 10 and conveyor 12 are shown in the illustrated machine, these may be dispensed with when the machine is employed in a processing line which includes a supporting conveyor, the head 14 being then positioned in proper relation above the supporting conveyor and the circuitry modified to synchronize the movement of the belt assembly 20 and the bag supporting conveyor.

In using the machine the bags B are fed into the entrance end (at the right in FIG. 1) with the top margins flat folded to close the bag mouth. The conveyor assembly 20 advances the bags B through the sealing zone where hot air is applied to the seam area between the vertically spaced runs of the belts 30, 30' and 31, 31' to activate the adhesive material or fuse the contacting surfaces of the thermosealing material. The conveyor assembly advances the bag to the cooling area where cool air sets the seal while it is still confined between the conveyor belts which clamp the material above and below the seal area. If there is a change in thickness of the material, as for example, in sealing a gusseted bag, the sensor switch 80 is actuated by movement of pulley 27 and the advance of the bag is slowed down to apply a greater amount of heat to the seal area. The necessary adjustment and control of the heat may be made according to the properties of the bag material.

I claim:

1. A machine for sealing the folded tops of bags which are formed with a heat activatable substance on the confronting faces of the material where the seal is to be made, which machine comprises a sealing head and conveyor means to advance each bag so that the closed top thereof moves past a seal forming station and a seal cooling station, a power drive for said bag advancing conveyor means, and a sensing means associated with said conveyor means which is actuated by changes in the thickness of the material in the seal forming area and said sensing means being operative to control the operation of said power drive so as to vary the speed of said conveyor means and to automatically reduce said speed when there is an increase in the thickness of the material at the seal forming station.

2. A machine as set forth in claim 1 and said conveyor means comprising endless belt conveyors disposed with runs thereof in opposed relation for gripping therebetween the bag top material.

3. A machine as set forth in claim 1 and said conveyor means comprising endless traveling belt assemblies with runs thereof in opposed relation for gripping therebetween the bag top material.

4. A machine as set forth in claim 3 and said belt assemblies comprising pairs of belt sections spaced to expose between them the area of the bag top in which the seam is to be formed, and means at the seal forming station for applying sealing heat to the exposed area.

5. A machine as set forth in claim 4 and said means for applying sealing heat comprising hot air nozzles having a connection with a hot air supply.

6. A machine as set forth in claim 4 and said means for applying sealing heat comprising elongate nozzle forming tubes disposed on opposite sides of the path of travel of the seam area and having spaced perforations for directing heated air onto the seam area and means connecting said tubes to a source of heated air.

7. A machine as set forth in claim 4 and said means for applying sealing heat including hot air tubes having spaced perforations for directing heated air onto the seam area and associated means connected to said hot air tubes for supplying the heated air.

8. In a machine for sealing the folded tops of bags which are formed with a heat activatable substance on the confronting faces of the material where the seal is to be made, which machine comprises a sealing head and co-operating bag gripping conveyor means for advancing each bag so that the closed top thereof moves past a seal forming station, a power drive for said bag advancing conveyor means, said conveyor means comprising endless traveling belt assemblies disposed in a common plane with runs thereof in opposed relation for gripping therebetween the bag top material, said conveyor belt assemblies having top and bottom bag gripping portions which are spaced so as to expose the area in which the seal is to be made, hot air nozzles at the seal forming station which are in the form of elongated tubes having discharge openings disposed on opposite sides of said bag gripping conveyor runs for directing hot air between said spaced belt portions and onto the seal forming area, and means responsive to change in the thickness of the material in the seal forming area for controlling said conveyor power drive so as to automatically adjust the speed of said conveyor according to the thickness of the material at the seal forming station and enable the material in the seal forming area to be exposed to the hot air for the proper period required for sealing.

9. In a machine for sealing the folded tops of bags which are formed with a heat activatable substance on the confronting faces of the material where the seal is to be made, which machine comprises a sealing head and co-operating bag gripping conveyor means for advancing each bag so that the closed top thereof moves past a seal forming station, a power drive for said bag advancing conveyor means, said conveyor means comprising endless traveling belt assemblies disposed in a common plane with runs thereof in opposed relation for gripping therebetween the bag top material, said conveyor assemblies being arranged to expose the area in which the seal is to be made, hot air nozzles at the seal forming station which are in the form of elongated tubes having discharge openings for directing hot air onto the seal forming area, said conveyor assemblies being arranged on spaced end pulleys of one conveyor assembly mounted for movement toward and from the end pulleys of the other conveyor assembly, power means for driving said belt assemblies and a speed control means for said power drive means which includes a sensing device actuated by movement of one of said pulleys whereby a change in the thickness of the material passing between said pulleys will result in a change in the speed of said pulley assemblies so as to vary the heat applied to the seam area according to the thickness of said area.

10. In a machine as set forth in claim 8, and means to supply hot air to said nozzles comprising a coiled tube having a connection with an air supply and electrical means for heating the walls of said coiled tube to heat the air passing through said tube.

References Cited
UNITED STATES PATENTS

| | | | |
|---|---|---|---|
| 3,286,433 | 11/1966 | Johnson et al. | 53—373X |
| 3,340,678 | 9/1967 | Rhodes | 53—373X |

TRAVIS S. McGEHEE, Primary Examiner

U.S. Cl. X.R.

53—373; 156—360

UNITED STATES PATENT OFFICE
CERTIFICATE OF CORRECTION

Patent No. 3,606,727          Dated September 21, 1971

Inventor(s) William L. Davis

It is certified that error appears in the above-identified patent and that said Letters Patent are hereby corrected as shown below:

Column 6, last line, after "pulleys" insert

-- with the pulleys --

Signed and sealed this 8th day of February 1972.

(SEAL)
Attest:

EDWARD M. FLETCHER, JR.
Attesting Officer

ROBERT GOTTSCHALK
Commissioner of Patents